United States Patent
Landais et al.

(10) Patent No.: US 11,729,739 B2
(45) Date of Patent: Aug. 15, 2023

(54) SUPPORT OF WLAN LOCATION CHANGE REPORTING OR RETRIEVAL FOR UNTRUSTED WLAN ACCESS TO A 3GPP PACKET CORE NETWORK

(71) Applicant: Alcatel Lucent, Nozay (FR)

(72) Inventors: Bruno Landais, Lannion (FR); Laurent Thiebaut, Nozay (FR)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/775,187

(22) PCT Filed: Nov. 10, 2016

(86) PCT No.: PCT/EP2016/077268
§ 371 (c)(1),
(2) Date: May 10, 2018

(87) PCT Pub. No.: WO2017/081153
PCT Pub. Date: May 18, 2017

(65) Prior Publication Data
US 2018/0343637 A1 Nov. 29, 2018

(30) Foreign Application Priority Data
Nov. 10, 2015 (EP) ..................................... 15306781

(51) Int. Cl.
*H04W 64/00* (2009.01)
*H04W 84/12* (2009.01)

(52) U.S. Cl.
CPC .......... *H04W 64/003* (2013.01); *H04W 84/12* (2013.01)

(58) Field of Classification Search
None
See application file for complete search history.

(56) References Cited

U.S. PATENT DOCUMENTS

| 2014/0221004 A1* | 8/2014 | Goldfarb | H04W 4/02 455/456.1 |
| 2015/0195771 A1* | 7/2015 | Hurtta | H04W 48/14 370/338 |

(Continued)

FOREIGN PATENT DOCUMENTS

| CN | 1491012 A | 4/2004 |
| CN | 102224721 A | 10/2011 |

(Continued)

OTHER PUBLICATIONS

Office Action dated Mar. 26, 2019, issued in corresponding Japanese Application No. 2018-524217.

(Continued)

*Primary Examiner* — Alex Skripnikov
*Assistant Examiner* — Pamit Kaur
(74) *Attorney, Agent, or Firm* — Harness, Dickey & Pierce, P.L.C.

(57) ABSTRACT

In an embodiment, there is provided a 3GPP AAA Server, configured to, for the support of reporting or retrieval of location information, referred to as WLAN location information, of a WLAN AN where a User Equipment (UE) is attached for access to a 3GPP Packet Core Network via Untrusted WLAN access:—provide new WLAN location information or an indication of the absence of WLAN location information to a function such as the ePDG that terminates the secured link with the said UE over Untrusted access to 3GPP Packet Core Network, in case of UE mobility.

11 Claims, 3 Drawing Sheets

(56) References Cited

U.S. PATENT DOCUMENTS

Figure 1:
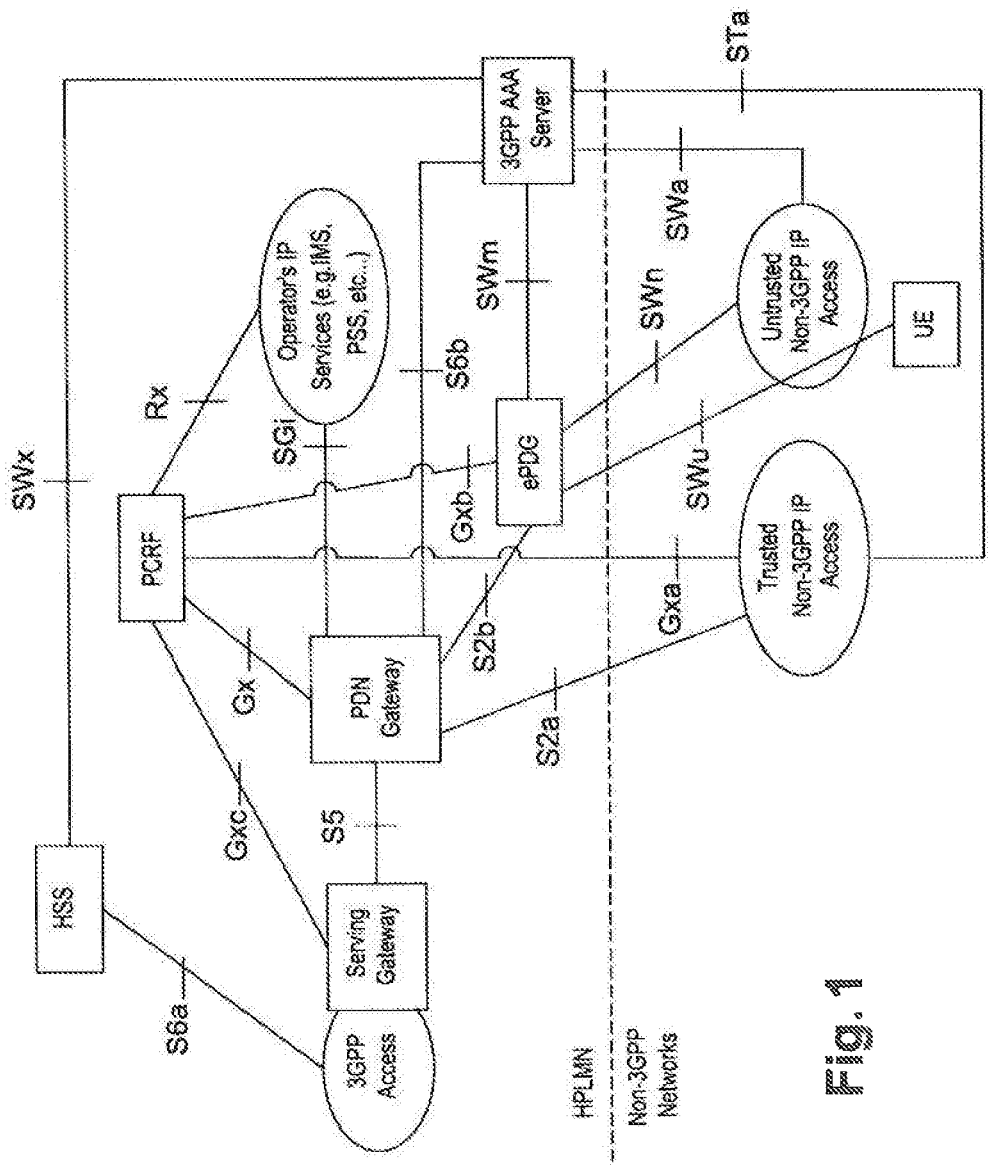

| | | | |
|---|---|---|---|
| 2015/0215890 A1 | 7/2015 | Nagatomo | |
| 2016/0057728 A1* | 2/2016 | Dhammawat | H04W 72/53 455/456.6 |
| 2017/0086162 A1* | 3/2017 | Osterlund | H04W 8/08 |
| 2017/0231020 A1* | 8/2017 | Tomici | H04L 63/0281 |
| 2017/0318414 A1* | 11/2017 | Kall | H04W 4/02 |
| 2017/0353942 A1* | 12/2017 | Stojanovski | H04L 63/0892 |

FOREIGN PATENT DOCUMENTS

| | | |
|---|---|---|
| CN | 103249028 A | 8/2013 |
| CN | 104469856 A | 3/2015 |
| CN | 104521287 A | 4/2015 |

OTHER PUBLICATIONS

Alcatel-Lucent et al: 11 Network provided WLAN Location Information for PDN connection establishment over S2b 11 3GPP Draft; C4-151543, 3rd Generation Partnership Project (3GPP), Mobile Competence Centre. 650, Route Des Luc I 0 Les . F-06921 ' Sophia-Anti Polis Cedex France v' al. CT WG4, No. Belgrade, Republic of Serbia; Oct. 12, 2015-Oct. 16, 2015 Oct. 12, 2015 (Oct. 12, 2015)' XP050999083, Retrieved from the Internet: URL:http:jjwww. 3gpp.orgjftpjMeetings 3GPP—SYNC/CT4/Docsj [retrieved on Oct. 12, 2015] the whole document.

3rd Generation Partnership Project; Technical Specification Group Core Network and Terminals; Access to the 3GPP Evolved Packet Core (EPC) via non-3GPP access networks; Stage 3 (Release 13)u, 3GPP Draft; Draft 24302-D30-V3, 3rd Generation Partnership Project (3GPP), Mobile Competence Centre ; 650, Route Des Lucioles ; F-06921 Sophia-Antipolis Cedex; France Sep. 22, 2015 (Sep. 22, 2015), XP051018091, Retrieved from the Internet: URL:http:jjwww.3gpp.orgjftpjtsg ct/WG1 mmcc-sm ex-CN1/ TSGC1 94 Belgradejdraftspecs after69/—[retrieved on Sep. 22, 2015] paragraphs [0004]—[04.6], [5.1.3.2.3.3], [06.5]—[6.8.2.3. 3]—paragraph [annexa]; figure a1.

Office Action dated Dec. 26, 2019, issued in corresponding Chinese Patent Application No. 201680078366.8.

Office Action dated Sep. 3, 2020, issued in corresponding Chinese Patent Application No. 201680078366.8.

Korean Notice of Preliminary Rejection dated May 27, 2019 in corresponding Korean Application No. 10-2018-7014997, with an English translation.

* cited by examiner

SUPPORT OF WLAN LOCATION CHANGE REPORTING OR RETRIEVAL FOR UNTRUSTED WLAN ACCESS TO A 3GPP PACKET CORE NETWORK

CROSS-REFERENCE TO RELATED APPLICATIONS

This is a national phase under 35 U.S.C. § 371 of PCT International Application No. PCT/EP2016/077268 which has an International filing date of Nov. 10, 2016, which claims priority to European Application No. 15306781.4 filed Nov. 10, 2015, the entire contents of each of which are hereby incorporated by reference.

The present invention generally relates to mobile communication networks and systems.

Descriptions of mobile networks and systems can be found in the literature, such as in particular in Technical Specifications published by standardization bodies such as for example 3GPP (3$^{rd}$ Generation Partnership Project).

An example of 3GPP mobile system is EPS (Evolved Packet System). In a system such as EPS, a User Equipment UE has access to various external IP networks referred to as PDN (Packet Data Network), such as IMS network, via an EPS network also referred to as access network (or IP Connectivity Access Network IP-CAN).

An EPS network includes a Core Network called EPC (Evolved Packet Core) providing IP connectivity (referred to as PDN connectivity). EPC can be accessed not only by 3GPP access, but also by non-3GPP access, such as in particular WLAN access will be considered more particularly in the following. WLAN access to EPC is specified in particular in 3GPP TS 23.402, and includes Trusted WLAN access and Untrusted WLAN access. An example of architecture for 3GPP and Non 3GPP (Trusted or Untrusted) access to EPC is recalled in FIG. 1 taken from 3GPP TS 23.402.

Untrusted WLAN access, which will be considered more particularly in the following, involves entities such as ePDG (evolved Packet Data Gateway) and 3GPP AAA Server, and interfaces such as SWa interface between WLAN AN (WLAN Access Network) and 3GPP AAA Server, and SWm interface between ePDG and 3GPP AAA Server, as specified in particular by 3GPP TS 23.402. Authentication and authorization procedures and protocols for these procedures are specified in particular in 3GPP TS 33.402 and 3GPP TS 29.273.

There may be similar concepts in systems other than EPS, such as GPRS (replacing EPC by GPRS Core Network, and ePDG by PDG), although in the following description, the EPS case will be considered more particularly (by way of example only).

In such systems, information related to the location of the user (referred to as UE location information), retrieved from the access network, may be required e.g. in IMS (e.g. by a P-CSCF or an Application Server AS) e.g. at the set-up of an IMS session, or at addition or removal of media during the IMS session, or at the release of the IMS session.

Procedures enabling to report UE location information have therefore been introduced for Untrusted WLAN access, enabling to report the current user's location, referred to as WLAN location information.

However, as recognized by the inventors and as will be explained with more detail later, such procedures currently do not enable to report or retrieve a change of WLAN location information, such as when the UE moves to a new AP (Access Point) while keeping its IKEv2 tunnel with the ePDG (and thus the PDN connection with the PGW).

Thus, there is a need to improve the support of reporting or retrieval of WLAN location information for Untrusted WLAN access. Embodiments of the present invention in particular address such needs.

These and other objects are achieved, in one aspect, by a 3GPP 3GPP AAA Server, configured to, for the support of reporting or retrieval of location information, referred to as WLAN location information, of a WLAN AN where a User Equipment UE is attached for access to a 3GPP Packet Core Network via Untrusted WLAN access:
  provide new WLAN location information or an indication of the absence of WLAN location information to the function that terminates the secured link with the said UE over Untrusted access to 3GPP Packet Core Network, in case of UE mobility.

These and other objects are achieved, in another aspect, by a function that terminates the secured link with the said UE over Untrusted access to 3GPP Packet Core Network such as an ePDG configured to, for the support of reporting or retrieval of location information, referred to as WLAN location information, of a WLAN AN where a User Equipment UE is attached for access to a 3GPP Packet Core Network via Untrusted WLAN access:
  fetch WLAN location information from a 3GPP AAA Server, in case said ePDG needs to report User Location Information ULI.

These and other objects are achieved, in another aspect, by a 3GPP AAA Server, configured to, for the support of reporting or retrieval of location information, referred to as WLAN location information, of a WLAN AN where a User Equipment UE is attached for access to a 3GPP Packet Core Network via Untrusted WLAN access:
  advertise which of two WLAN Location Information Retrieval WLIR modes said 3GPP AAA Server supports, said two modes including a push mode wherein the 3GPP AAA Server pushes changes of WLAN Location Information to an ePDG, and a pull mode wherein the ePDG pulls WLAN Location Information from a 3GPP AAA Server.

These and other objects are achieved, in another aspect, by an ePDG, configured to, for the support of reporting or retrieval of location information, referred to as WLAN location information, of a WLAN AN where a User Equipment UE is attached for access to a 3GPP Packet Core Network via Untrusted WLAN access:
  advertise which of two WLAN Location Information Retrieval WLIR modes said ePDG supports, said two modes including a push mode wherein the 3GPP AAA Server pushes changes of WLAN Location Information to an ePDG, and a pull mode wherein the ePDG pulls WLAN Location Information from a 3GPP AAA Server.

These and other objects are achieved, in another aspect, by an WLAN Access Network WLAN AN, configured to, for the support of reporting or retrieval of location information, referred to as WLAN location information, of a WLAN AN where a User Equipment UE is attached for access to a 3GPP Packet Core Network via Untrusted WLAN access:
  report a change of WLAN location information to a 3GPP AAA Server, in case of UE mobility, if so requested by the 3GPP AAA Server.

These and other objects are achieved, in another aspect, by a 3GPP AAA Server, configured to, for the support of reporting or retrieval of location information, referred to as WLAN location information, of a WLAN AN where a User Equipment UE is attached for access to a 3GPP Packet Core Network via Untrusted WLAN access, to perform at least one of the following actions, upon receipt of a User Profile Update Request from an Home Subscriber Server HSS to request WLAN location information for Untrusted WLAN access:

return the WLAN location information in an Untrusted WLAN Access to the Home Subscriber Server HSS initiate a re-authentication and authorization procedure over SWa interface towards the WLAN AN, to retrieve WLAN location information.

These and other objects are achieved, in another aspect, by an Application Server, configured to, for the support of reporting or retrieval of location information, referred to as WLAN location information, of a WLAN AN where a User Equipment UE is attached for access to a 3GPP Packet Core Network via Untrusted WLAN access:

send an Sh Pull Request message to a Home Subscriber Server HSS, requesting WLAN location information for Untrusted WLAN access from a 3GPP AAA Server.

These and other objects are achieved, in another aspect, by an Home Subscriber Server HSS, configured to, for the support of reporting or retrieval of location information, referred to as WLAN location information, of a WLAN AN where a User Equipment UE is attached for access to a 3GPP Packet Core Network via Untrusted WLAN access:

initiate a User Profile Update Request to request WLAN location information for Untrusted WLAN access.

These and other objects are achieved, in other aspects, by method(s) for support of reporting or retrieval of location information, referred to as WLAN location information, of a WLAN AN where a User Equipment UE is attached for access to a 3GPP Packet Core Network via Untrusted WLAN access, said method(s) comprising at least one step performed by at least one of above entities (3GPP AAA Server, ePDG or PDG, WLAN Access Network, HSS, Application Server).

Figure 2:
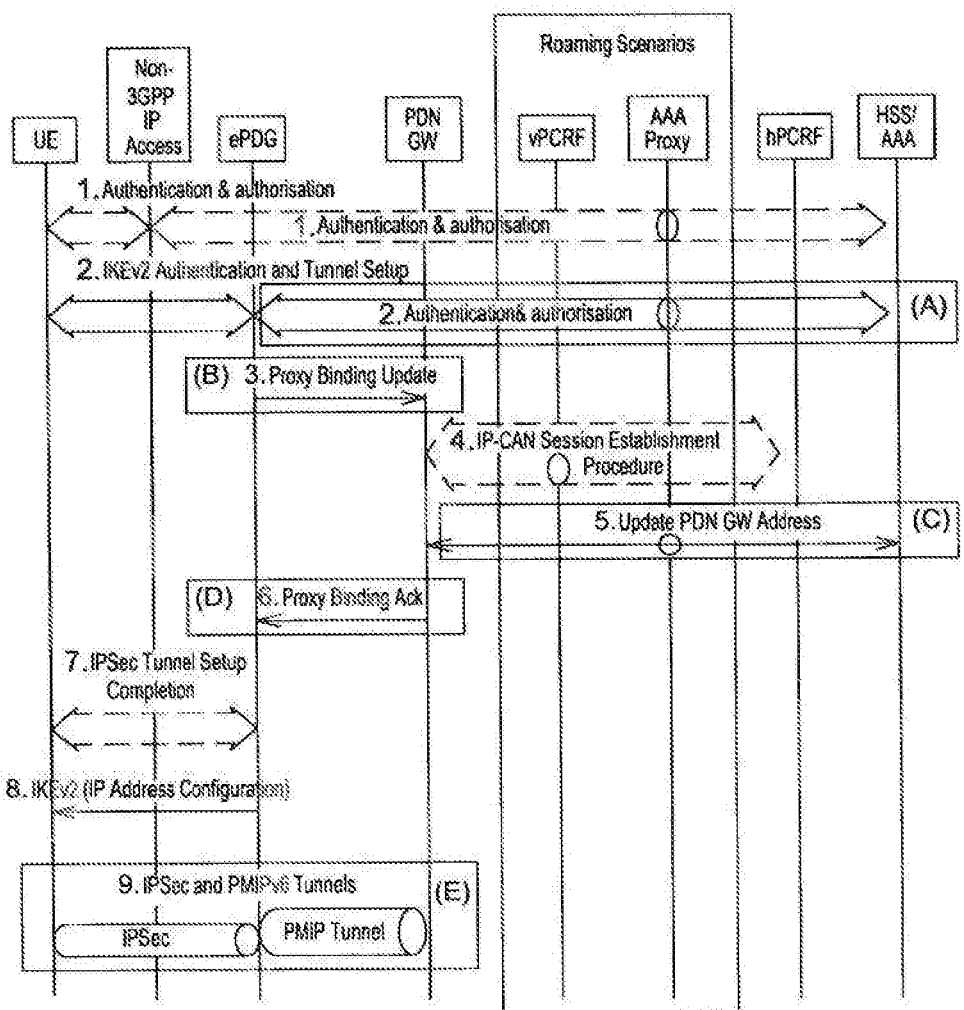
Figure 3:
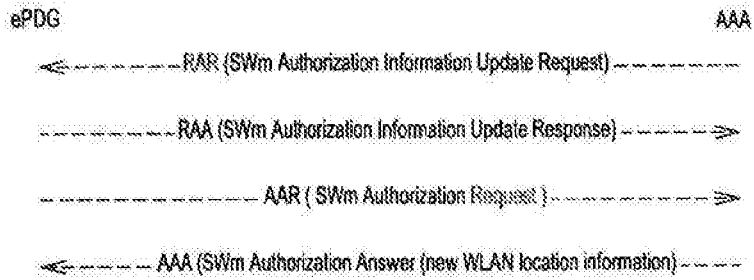
Figure 4:
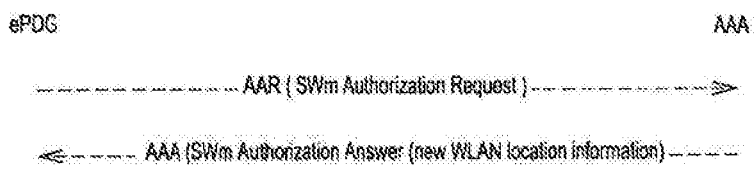
Figure 5:
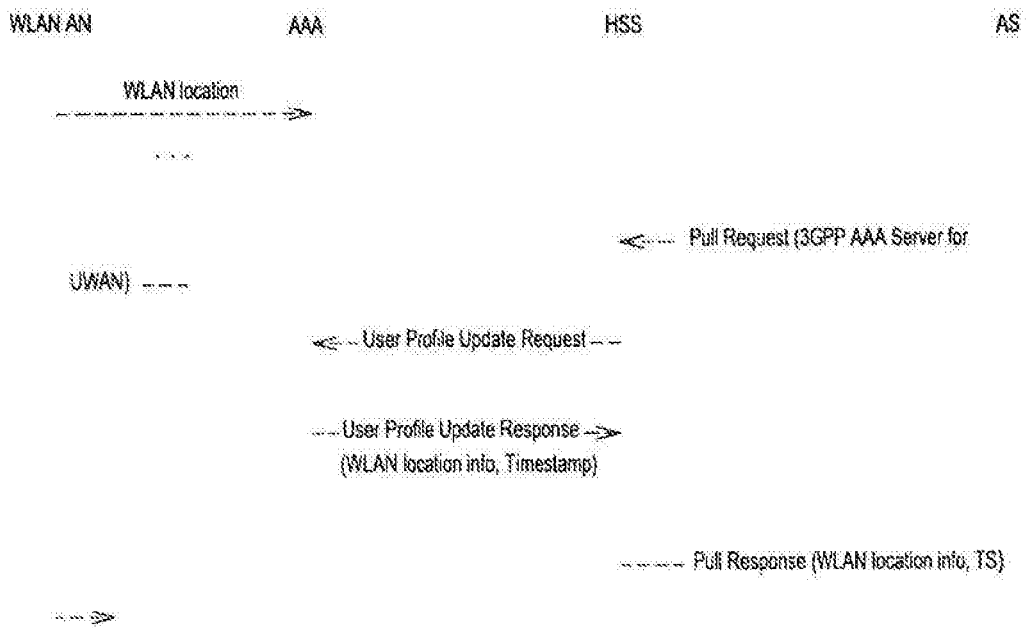

Some embodiments of apparatus and/or methods in accordance with embodiments of the present invention are now described, by way of example only, and with reference to the accompanying drawings, in which:

FIG. 1 is intended to recall an example of architecture for 3GPP and Non 3GPP (Trusted or Untrusted) access to EPC, FIG. 2 is intended to recall an example of signaling flow for PDN connection establishment procedure over Untrusted WLAN access, FIG. 3 is intended to illustrate a signaling flow according to embodiments of the invention, FIG. 4 is intended to illustrate a signaling flow according to embodiments of the invention, FIG. 5 is intended to illustrate a signaling flow according to embodiments of the invention.

ABBREVIATIONS

AAA Authentication Authorization Accounting
AKA Authentication and Key Agreement
AN Access Network
AVP Attribute Value Pair
DEA Diameter EAP Answer
DER Diameter EAP Request
EAP Extensible Authentication Protocol
EPC Evolved Packet Core
ePDG Evolved Packet Data Gateway
EPS Evolved Packet System
GPRS General Packet Radio Service
HSS Home Subscriber Server
IKE Internet Key Exchange
IMS IP Multimedia Subsystem
NTP Network Time Protocol
PDG Packet Data Gateway
PDN Packet Data Network
PGW PDN Gateway
PLMN Public Land Mobile Network
TWAN Trusted WLAN Access Network
UWAN Untrusted WLAN Access Network
UE User Equipment
WLAN Wireless Local Area Network

Description of Various Aspects and/or Embodiments of the Invention

Information related to the location of the user provided by the access network may be required in IMS in order to comply with regulatory requirements (e.g. data retention, lawful interception) and/or in order to enable certain types of added value services based on the user's location. The user location information is also reported to IMS and used by operators to assess the Quality of Experience of users in their network and to trouble-shoot problems reported to Customer Care).

For this purpose, Network Provided Location Information (NPLI) retrieval procedures have been specified in earlier 3GPP releases which enable the P-CSCF and the AS to retrieve the user location in GPRS/EPS or in non-EPS for a trusted WLAN access, during the setup of an IMS session, the addition or removal of media or the release of an IMS session.

See 3GPP TS 23.228 Annexes E.7, R and T.1.

Extensions are being defined in 3GPP Rel-13 to support the same for a user accessing the EPC via an untrusted WLAN access, and thus to report the WLAN location information from an ePDG to the PGW and IMS, during the setup or release of an emergency and non-emergency PDN connection, or during the creation, modification or release of a dedicated bearer over S2b. See CR 23.402 #2906, S2-153711, http://www.3gpp.org/ftp/tsq_sa/WG2_Arch/TSGS2_111_Chengdu/Docs/S2-153711.zip)

The WLAN location information may contain the SSID, BSSID, WLAN operator name or the civic address of the AP to which the user is connected. The WLAN location information can be reported from the WLAN Access Network to the ePDG during the authentication and authorization procedure prior to the PDN connection establishment.

See CR 29.273 0430 in C4-151715,
http://www.3gpp.org/ftp/tsq_ct/WG4_protocollars_ex-CN4/TSGCT4_70bis_Belgrade/Docs/C4-151715.zip, and CR 29.274 in C4-151721,
http://www.3gpp.org/ftp/tsq_ct/WG4_protocollars_ex-CN4/TSGCT4_70bis_Belgrade/Docs/C4-151721.zip However, no procedures currently exist over the SWa (WLAN AN to 3GPP AAA Server) and SWm (ePDG—3GPP AAA Server) interfaces to update the ePDG with new WLAN location information, when the user moves to new APs while keeping its IKEv2 tunnel/PDN connection with the ePDG (e.g. using MOBIKE), e.g. user moving on a campus.

Therefore the ePDG can not currently report the current user's WLAN location information when e.g. an IMS session is set up or released or when media is added/removed after the establishment of the PDN connection or when (IMS) PDN connection is released.

First and second parts of embodiments and/or aspects of the invention, referred to hereafter as 1) and 2) include:

1/ New procedures are defined over the SWa (WLAN AN < > 3GPP AAA Server) and the SWm (ePDG < > 3GPP AAA Server) interfaces
  A) To enable the WLAN Access Network to report change of WLAN location information to the 3GPP AAA Server and
  B) to forward WLAN location information to the ePDG, so as to keep the ePDG aware of the current WLAN location information of the user and have the ePDG able to provide the PGW (and the IMS) with up to date WLAN location information.

2/ Procedures are also defined over the Sh (AS < > HSS), SWx (HSS < > 3GPP AAA Server) and SWa (HSS < > WLAN AN) interfaces to enable an AS to query the current WLAN location information of a user.

Description of Part 1) of Embodiments and/or Aspects of the Invention

1/ Per requirements specified in 3GPP Rel-13, the WLAN Access Network can report the WLAN location information and optionally a WLAN location timestamp to the 3GPP AAA Server during the authentication and authorization procedure over SWa. The 3GPP AAA server stores this information, when considered as trusted information (e.g. the PLMN operator is also the WLAN operator), and sends it to the ePDG during a subsequent SWm authentication and authorization procedure, together with the WLAN location timestamp if available.

Embodiments of the invention take into account that the UE may move to a different AP while staying connected to the same ePDG. 2 steps may be provided:
  A) To enable the WLAN Access Network to report change of WLAN location information to the 3GPP AAA Server and
  B) To provide WLAN location information from the 3GPP AAA server to the ePDG, so as to keep the ePDG aware of the current WLAN location information of the user and have the ePDG able to provide the PGW (and the IMS) with up to date WLAN location information.

The ePDG is therefore able to provide the current WLAN location information and associated timestamp (if available) towards the PGW, during any S2b procedure (bearer creation, modification or deletion or PDN connection release).

The feature is mostly intended for the PDN connection supporting IMS services (regular or emergency) (in association with procedures related with dedicated bearer) but should be made generic.

Step A) Enabling the WLAN Access Network to Report Change of WLAN Location Information to the 3GPP AAA Server As part of embodiments of this invention, if the UE moves to a different AP while staying connected to the same ePDG (e.g. using MOBIKE), either
  the WLAN AN triggers a new re-authentication and authorization procedure or a (re-) authorization procedure (with the new WLAN location info) to the 3GPP AAA Server, for the same SWa session, or
  the WLAN AN tears down the previous SWa session and establishes a new SWa session (e.g. if the SWa session terminates in the AP itself), i.e. the 3GPP AAA Server will see a new SWa session establishment (with new WLAN location info and timestamp) and the release of the previous SWa session (possibly in any order).

In both cases, the 3GPP AAA Server replaces the WLAN location information stored for the user with the most recent WLAN location information, The UE may move from a place where WLAN Location Information is available (the 3GPP AAA Server trusts WLAN location information that the WLAN AN provides) to a place where it is no more available (e.g. the 3GPP AAA Server does not trust WLAN location information that the WLAN AN provides or the WLAN AN does not provide any such information). The opposite situation is also possible. This means that in step B, the WLAN has to be able to tell when WLAN location information is available.

Step B) Providing WLAN Location Information From the 3GPP AAA Server to the ePDG 2 methods/modes are possible in order for the ePDG to get WLAN location information (WLAN Location Information Retrieval mode or WLIR mode)

B.1) PUSH Mode to Provide WLAN Location Information from the 3GPP AAA Server to the ePDG
  The 3GPP AAA server when it detects UE mobility pushes the new WLAN location information to the ePDG: The 3GPP AAA server initiates an SWm Authorization Information Update procedure to trigger the ePDG to initiate a new authorization procedure towards the AAA, during which the AAA can push the new WLAN location information and timestamp to the ePDG B.2) PULL Mode to Get WLAN Location Information from the ePDG
  When it needs WLAN location information (*) the ePDG queries/pulls it from the 3GPP AAA server
    (*) when it needs to send ULI (e.g. when it needs to send a Create Bearer Response or a Delete bearer Response).

B.3) Choice Between the Push and the Pull Mode for WLAN Location Information Retrieval (WLIR Mode)
  The best (push/pull) mode depends on whether the number of SWa Re-authentication is bigger or smaller than the number of IMS sessions events (set-up, bearer addition, release, . . . )
    Taking the traffic light scenario (*) the number of SWa RE-authentication may be high while the user is not engaged in any IMS session so in push mode useless information is sent to the ePDG
      (*) the UE in a car, does not connect onto the town Wifi while the car is moving (the UE waits for a stable WiFi signal to connect to an AP) but connects at each red traffic light (when the car stops let say for more than 15 s). In that case the UE will keep on changing of AP, even though the S2b session is kept (the frequency of the IKE liveliness check is lower than the frequency of stops at a red traffic light
    Conversely when the UE does not move, with the pull mode the ePDG will fetch the same information at the start/update and release of an IMS session
  Both modes seem to be useful and thus need to be defined. The algorithm to define the most suitable mode is defined in step B.3 of the call flows.

Call Flow
Procedures Currently Defined

FIG. 2 provides an example of an PDN connection establishment over an untrusted WLAN access (per existing specification and Rel-13 enhancements).

In step 1, the WLAN AN initiates an SWa Authentication and Authorization procedure, including the WLAN Location information in the Request sent to the 3GPP AAA Server—as specified in 3GPP Rel-13 (29.273 CR 0430, C4-151715, agreed during CT4 #70bis
  http://www.3gpp.org/ftp/tsg_ct/WG4_protocollars_ex-CN 4/TSGCT4_70bis_Belgrade/Docs/C4-151715.zip)

TABLE 4.1.2.1/1

SWa Authentication and Authorization Request

| Information element name | Mapping to Diameter AVP | Cat. | Description |
| --- | --- | --- | --- |
| User Identity | User-Name | M | This information element shall contain the identity of the user. The identity shall be represented in NAI form as specified in the IETF RFC 4282 [15] and shall be formatted as defined in clause 19 of 3GPP TS 23.003 [14]. This IE shall include the leading digit used to differentiate between authentication schemes. |
| EAP payload | EAP-payload | M | This IE shall contain the Encapsulated EAP payload used for the UE - 3GPP AAA Server mutual authentication |
| Authentication Request Type | Auth-Request-Type | M | This IE shall define whether the user is to be authenticated only, authorized only or both. AUTHORIZE_AUTHENTICATE shall be used in this case. |
| ... | ... | ... | ... |
| WLAN Location Information | Access-Network-Information | O | If present, this IE shall contain the location information of the WLAN Access Network where the UE is attached. |
| WLAN Location Timestamp | User-Location-Info-Time | O | This IE may be present if the WLAN Location Information IE is present. When present, this IE shall contain the NTP time at which the UE was last known to be in the location reported in the WLAN Location Information. |

In step 2, the ePDG forwards the WLAN location information and timestamp in the SWm Authentication and Authorization Answer message, as specified in 3GPP Rel-13 (29.273 CR 0430, C4-151715).

Step A) Enabling the WLAN Access Network to Report Change of WLAN Location Information to the 3GPP AAA Server As part of embodiments of the invention, if the 3GPP AAA Server requested the WLAN AN to report change of WLAN location information via a new information element in the SWa Authentication and Authorization Answer, when the WLAN AN detects that the user moves to a different AP, the WLAN AN shall either:

a) trigger a new re-authentication and authorization procedure, or a (re-)authorization procedure, for the same SWa session.

In the former case (re-authentication and authorization), the message/procedure is similar to the existing SWa Authentication and Authorization Request specified in 3GPP TS 29.273, but the procedure is invoked for an existing SWa session (as opposed to establish a new SWa session).

In the latter case (re-authorization procedure), the SWa request is similar to the existing SWa Authentication and Authorization procedure, but with the Authentication Request Type set to AUTHORIZE_ONLY. The WLAN AN includes the last EAP-Payload sent in a former request, or a Dummy EAP payload (to be decided by 3GPP), and set an extra flag in the Request to tell the 3GPP AAA server that it should disregard the EAP-Payload, since the EAP-AKA' challenge response has been already successfully checked (a similar approach to disregard the EAP payload was specified for trusted WLAN in Single-Connection Mode (SCM) over the STa interface—the issue being that the EAP Payload is mandatory in the DER message per IETF RFC).

SWa Authentication and Authorization Answer with the Authentication Request Type Set to AUTHORIZE_ONLY Note: The new behavior brought by embodiments of the invention consists in providing WLAN Location Information and WLAN Location Timestamp when the Authentication Request Type set to AUTHORIZE_ONLY, and to indicate a dummy EAP Payload in that case.

The table below is intended to illustrate information element contents of a SWa Authentication and Authorization Request message sent during a re-authorization procedure according to embodiments of the invention. Some elements introduced according to embodiments of the invention are underlined in this table.

| Information element name | Mapping to Diameter AVP | Cat. | Description |
| --- | --- | --- | --- |
| User Identity | User-Name | M | This information element shall contain the identity of the user. The identity shall be represented in NAI form as specified in the IETF RFC 4282 [15] and shall be formatted as defined in clause 19 of 3GPP TS 23.003 [14]. This IE shall include the leading digit used to differentiate between authentication schemes. |

| Information element name | Mapping to Diameter AVP | Cat. | Description |
|---|---|---|---|
| EAP payload | EAP-payload | M | This IE shall contain the Encapsulated EAP payload used for the UE - 3GPP AAA Server mutual authentication<br>This will contain a dummy EAP Payload or the EAP payload sent in the earlier EAP exchange. |
| Authentication Request Type | Auth-Request-Type | M | This IE shall define whether the user is to be authenticated only, authorized only or both. AUTHORIZE_ONLY shall be used in this case. |
| UE Layer-2 address | Calling-Station-ID | M | This IE shall carry the Layer-2 address of the UE. |
| Access Type | RAT-Type | C | If present, this IE shall contain the untrusted non-3GPP access network technology type that is serving the UE. |
| Access Network Identity | ANID | O | If present, this IE shall contain the access network identifier used for key derivation at the HSS. (See 3GPP TS 24.302 [26] for all possible values)<br>It shall be included if the non-3GPP access network selects the EAP-AKA' authentication method. |
| Full Name for Network | Full-Network-Name | O | If present, this IE shall contain the full name for network as specified in 3GPP TS 24.302 [26]. This AVP may be inserted by the non-3GPP access network depending on its local policy and only when it is not connected to the UE's Home Network |
| Short Name for Network | Short-Network-Name | O | If present, this IE shall contain the short name for network as specified in 3GPP TS 24.302 [26]. This AVP may be inserted by the non-3GPP access network depending on its local policy and only when it is not connected to the UE's Home Network |
| Transport Access Type | Transport-Access-Type | C | For interworking with Fixed Broadband access networks (see 3GPP TS 23.139 [39]), if the access network needs to receive the IMSI of the UE in the authentication response, then this information element shall be present, and it shall contain the value "BBF" (see subclause 5.2.3.19). |
| Supported Features (See 3GPP TS 29.229 [24]) | Supported-Features | O | If present, this information element shall contain the list of features supported by the origin host for the lifetime of the Diameter session. |
| WLAN Location Information | Access-Network-Information | O | If present, this IE shall contain the location information of the WLAN Access Network where the UE is attached. |
| WLAN Location Timestamp | User-Location-Info-Time | O | This IE may be present if the WLAN Location Information IE is present.<br>When present, this IE shall contain the NTP time at which the UE was last known to be in the location reported in the WLAN Location Information. |
| DER Flags | DER-Flags | O | Indicates that this authorization request is only sent for the purpose of updating the WLAN location information and thus that the EAP Payload can be disregarded. | or b) Alternatively, the TWAN AN may release the existing SWa session towards the 3GPP AAA Server and re-establish a new one, using the existing SWa Authentication and Authorization procedure, and including the new WLAN location information and timestamp (or possibly no WLAN location information). This is also the approach that will occur if the AP supports the SWa termination end point and the UE moves to a new AP.

In both cases (a and b), the 3GPP AAA Server replaces (in its local storage) the WLAN location information and timestamp previously reported by the new WLAN location information and timestamp.

Step B) Providing WLAN Location Information from the 3GPP AAA Server to the ePDG, In both modes, the ePDG may receive no WLAN location information from the 3GPP AAA server. In that case, the ePDG may either keep (and report to the PGW) any WLAN location information received so far if it considers that this location is recent enough (using the WLAN location timestamp), or the ePDG considers that any WLAN location information received so far is no more valid and sends to the PGW whatever other location information it may have (such as the outer IP @ of the UE).

In both modes, if it has any valid WLAN location information the AAA server sends this WLAN location information to the ePDG at the set-up of the SWm session.

B.1) PUSH Mode to Provide WLAN Location Information from the 3GPP AAA Server to the ePDG The 3GPP AAA server, when it detects UE mobility, pushes the new WLAN location information to the ePDG: The 3GPP AAA server initiates an SWm Authorization Information Update procedure (see sub-clause 7.1.2.5.1 of 3GPP TS 29.273) to trigger the ePDG to initiate a new authorization procedure towards the 3GPP AAA server, during which the 3GPP AAA server can push the new WLAN location information and timestamp to the ePDG. The 3GPP AAA server does not provide WLAN location information in the SWm Authorization Answer (Diameter AAA) when it does not trust the WLAN location information received from the new AP or when the new AP does not provide such information A corresponding signaling flow is illustrated in FIG. 3.

The table below is intended to illustrate information element contents of a SWm Authorization Answer message according to embodiments of the invention. Some elements introduced according to embodiments of the invention are underlined in this table.

TABLE 7.1.2.2.1/2

| Information element name | Mapping to Diameter AVP | Cat. | Description |
|---|---|---|---|
| Permanent User Identity | User-Name | M | This information element shall contain the permanent identity of the user. The identity shall be represented in NAI form as specified in IETF RFC 4282 [15], and shall be formatted as defined in clause 19 of 3GPP TS 23.003 [14]; this IE shall not include the leading digit prepended in front of the IMSI used to differentiate between authentication schemes. |
| Request Type | Auth-Request-Type | M | It shall contain the value AUTHORIZE_ONLY. See IETF RFC 4072 [5]. |
| Registration Result | Result-Code/ Experimental Result Code | M | This IE shall contain the result of the operation. The Result-Code AVP shall be used for errors defined in the Diameter Base Protocol or as per in NASREQ. |
| UE IPv4 Home Address | PMIP6-IPv4-Home-Address | O | If the authorization succeeded, and the user has an IPv4-HoA statically defined as part of his profile data, then this IE may be present. It shall contain the IPv4-HoA allocated and assigned to the UE. |
| APN-OI replacement | APN-OI-Replacement | C | This AVP shall indicate the domain name to replace the APN-OI in the non-roaming case or in the home routed roaming case when constructing the PDN GW FQDN upon which it needs to perform a DNS resolution. See 3GPP TS 23.003 [3]. It shall only be included if NBM is used and the Result-Code AVP is set to DIAMETER_SUCCESS. |
| APN and PGW Data | APN-Configuration | C | This information element shall only be sent if the Result-Code AVP is set to DIAMETER_SUCCESS. APN-Configuration is a grouped AVP, defined in 3GPP TS 29.272 [29]. When NBM is used, the following information elements per APN may be included: APN APN-AMBR Authorized 3GPP QoS profile Statically allocated User IP Address (IPv4 and/or IPv6) Allowed PDN types PDN GW identity PDN GW allocation type VPLMN Dynamic Address Allowed Visited Network Identifier When local IP address assignment is used, this AVP shall only be present if IKEv2 based Home Agent discovery is used and if the PDN connection was active in case of HO, or if there is static PDN GW allocated to the UE's subscribed APN. In these cases, the following information elements shall be included: HA-APN (Home Agent APN as defined in 3GPP TS 23.003 [14]) PDN GW identity |

TABLE 7.1.2.2.1/2-continued

SWm Authorization Answer

| Information element name | Mapping to Diameter AVP | Cat. | Description |
|---|---|---|---|
| Trace information | Trace-Info | C | This AVP shall be included if the subscriber and equipment trace has been activated for the user in the HSS and signalling based activation is used to download the trace activation from the HSS to the ePDG.<br>Only the Trace-Data AVP shall be included if trace activation is requested. Only the Trace-Reference AVP shall be included if trace deactivation is requested.<br>If the Trace-Data AVP is included, it shall contain the following AVPs:<br>Trace-Reference<br>Trace-Depth<br>Trace-Event-List, for PGW<br>Trace-Collection-Entity<br>The following AVPs may also be included in the Trace-Data AVP:<br>Trace-Interface-List, for PGW, if this AVP is not present, trace report generation is requested for all interfaces for PGW listed in 3GPP TS 32.422 [32]<br>Trace-NE-Type-List, with the only allowed value being "PDN GW". If this AVP is not included, trace activation in PDN GW is required. |
| MSISDN | Subscription-ID | C | This AVP shall contain the MSISDN of the UE and shall be sent only if it is available. |
| UE Charging Data | 3GPP-Charging-Characteristics | O | If present, this information element shall contain the type of charging method to be applied to the user (see 3GPP TS 29.061 [31]). |
| Session time | Session-Timeout | C | If the authorization succeeded, then this IE shall contain the time this authorization is valid for. |
| WLAN Location Information | Access-Network-Information | O | If present, this IE shall contain the location information of the WLAN Access Network where the UE is attached.<br>New AVP in this message (as part of embodiments of the invention) |
| WLAN Location Timestamp | User-Location-Info-Time | O | This IE may be present if the WLAN Location Information IE is present.<br>When present, this IE shall contain the NTP time at which the UE was last known to be in the location reported in the WLAN Location Information.<br>New AVP in this message (as part of embodiments of the invention) |

B.2) PULL Mode to Get WLAN Location Information from the ePDG

When it needs to send ULI (User Location Information) over S2b, the ePDG fetches this information from the 3GPP AAA server. This mode uses thus the second part of the push mode A corresponding signaling flow is illustrated in FIG. 4.

B.3) Choice Between the Push and the Pull Mode for WLAN Location Information Retrieval (WLIR Mode)

- It is assumed that 3GPP will define a mandatory WLIR mode (push or pull) to implement in both the ePDG and the AAA server
- At the set-up of an SWm session, the ePDG and the AAA server advertise the WLIR mode they support (push, pull or both). The ePDG furthermore indicates the default WLIR mode to use for this particular SWm session in case the ePDG and the AAA server support both WLIR modes
  - A New IE is defined on SWm to allow the ePDG and the AAA server to advertise the WLIR mode they support. It is used in SWm Authentication and Authorization Request (from ePDG) and in Authentication and Authorization Answer (from 3GPP AAA server)
  - A New IE is defined on SWm to allow the ePDG furthermore indicates the default WLIR mode to use. It is used in SWm Authentication and Authorization Request (from ePDG)
- When one of the ePDG and the AAA server supports only one WLIR mode, that mode is selected as the WLIR mode for the entire SWm session.
- When both the ePDG and the AAA server supports both WLIR modes, the SWm session starts with the default WLIR mode indicated by the ePDG at SWm session initiation but any time the ePDG can modify the WLIR mode, indicating the new default WLIR mode in SWm Authorization Request (Diameter AAR).
  - Thus a new IE is needed in the SWm Authorization Request for the ePDG to be able to change the default WLIR mode An example of usage of this feature is
> The initial default WLIR mode is pull mode.
> When the ePDG detects the start of an IMS session (e.g. at the creation of a first dedicated bearer) it fetches the WLAN location information using SWm Authorization Request (Diameter AAR) and indicates the new WLIR mode (Push).
> When the ePDG detects the end of an IMS session (e.g. at the deletion of the last dedicated bearer) it fetches the WLAN location information using SWm Authorization Request (Diameter AAR) and indicates the new WLIR mode (Pull).
> Thus there is no signaling over SWm to provide WLAN location information as long as there is no IMS session.

Different modes may be used over the lifetime of an SWm session, and between different SWm sessions (depending on the mobility and activity behaviour of each subscriber).

As an alternative, the mode could be chosen based on operator policy, e.g. PUSH mode for SWm session related to the IMS APN, and PULL mode for SWm sessions related to non-IMS APNs.

Description of Part 2) of Embodiment and/or Aspects of the Invention

2/ Additionally, procedures are also defined (as part of embodiments of the invention) to enable an AS to query the current WLAN location information of a user, as follows:

When the AS needs to get the user location, it queries the HSS for the user's location (according to the principles of Annex R.5 of TS 23.228), but with a request to also get the WLAN location of the user if the user is accessing the EPC via an untrusted WLAN access, i.e;
> the AS initiates an Sh Pull Request (see subclause 6.1.1 of 3GPP TS 29.328) to request the location of the subscriber in the 3GPP AAA Server for Untrusted WLAN Access with the requested domain set to PS and the requested nodes indicating the value "3GPP AAA SERVER for UWAN" (new value, as part of embodiments of the invention, for the Requested-Nodes AVP specified in subclause 6.3.7A of 3GPP TS 29.329); the AS may alternatively initiate an Sh Pull Request to request the location of the subscriber in any WLAN access (i.e. with the requested nodes indicating the value "value "3GPP AAA SERVER for UWAN"+ "3GPP AAA SERVER for TWAN", or even more generally, in any access network.
> the HSS then initiates a User Profile Update Request (Push Profile Request) setting the Access-Network-Info-Request and/or UE-Local-Time-Zone-Request bits in the PPR-Flags, to request the user location, as currently specified in subclause 8.1.2.3.2 of 3GPP TS 29.273 for the trusted WLAN access;
> as part of embodiments of this invention, if the UE is attached to the EPC via an untrusted WLAN access, the 3GPP AAA Server then returns to the HSS the last WLAN location information and timestamp received from the WLAN AN (as explained in the part 1/of embodiments of the invention).

Description of Alternative Embodiments and/or Aspects of the Invention

NOTE: if it was not agreed in 3GPP that the WLAN AN dynamically updates the 3GPP AAA Server with the new WLAN location information (as proposed in 1/), the 3GPP AAA Server would behave then as follows:
> if the UE is attached to the EPC via an untrusted WLAN access, the 3GPP AAA Server shall initiate a new re-authentication and authorization request towards the WLAN AN (over SWa) as specified in subclause 4.1.2.4 of 3GPP TS 29.273.
> The WLAN AN then proceeds with a re-authentication and authorization procedure, as specified in 1/, including the last WLAN location information.
> the 3GPP AAA Server then returns to the HSS the last WLAN location information and timestamp received from the WLAN AN A corresponding signaling flow is illustrated in FIG. 5

Various aspects and/or embodiments of the invention include (though not being limited to) following aspects.

An aspect is a 3GPP AAA Server, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to) following embodiments, which may be taken alone or in combination, according to various combinations.

In an embodiment, said 3GPP AAA Server is configured to:
> provide new WLAN location information or an indication of the absence of WLAN location information to a function such as an ePDG that terminates the secured link with the said UE over Untrusted access to 3GPP Packet Core Network, in case of UE mobility.

In an embodiment, said 3GPP AAA Server is configured to:
> push new WLAN location information or an indication of the absence of WLAN location information to an ePDG, in case of UE mobility.

In an embodiment, said 3GPP AAA Server is configured to:
> initiate an SWm Authorization Information Update procedure over an SWm interface to an ePDG, to trigger the ePDG to initiate a new authorization procedure towards the 3GPP AAA Server,
> provide said new WLAN location information or an indication of the absence of WLAN location information in a SWm Authorization Answer sent towards said ePDG during said new authorization procedure.

Another aspect is an ePDG configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to) following embodiments, which may be taken alone or in combination, according to various combinations.

In an embodiment, said ePDG is configured to:
> fetch WLAN location information from a 3GPP AAA Server, in case said ePDG needs to report User Location Information ULI.

In an embodiment, said ePDG is configured to:
> initiate a new authorization procedure over SWm interface to said 3GPP AAA Server,
> receive WLAN location information or an indication of the absence of WLAN location information in a SWm Authorization Answer received from the 3GPP AAA Server during said procedure.

Another aspect is a 3GPP AAA Server, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to) following embodiments, which may be taken alone or in combination, according to various combinations.

In an embodiment, said 3GPP AAA Server is configured to:
advertise which of two WLAN Location Information Retrieval WLIR modes said 3GPP AAA Server supports, said two modes including a push mode wherein the 3GPP AAA Server pushes changes of WLAN Location Information to an ePDG, and a pull mode wherein the ePDG pulls WLAN Location Information from a 3GPP AAA Server.

In an embodiment, said 3GPP AAA Server is configured to:
include in an SWm Authentication and Authorization Answer an information element indicating which WLIR mode the 3GPP AAA Server supports.

In an embodiment, said 3GPP AAA Server is configured to:
choose a default WLIR mode to use for a particular SWm session, indicated by the ePDG, in case the ePDG and the 3GPP AAA Server support both WLIR modes.

Another aspect is an ePDG, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to) following embodiments, which may be taken alone or in combination, according to various combinations.

In an embodiment, said ePDG is configured to:
advertise which of two WLAN Location Information Retrieval WLIR modes said ePDG supports, said two modes including a push mode wherein the 3GPP AAA Server pushes changes of WLAN Location Information to an ePDG, and a pull mode wherein the ePDG pulls WLAN Location Information from a 3GPP AAA Server.

In an embodiment, said ePDG is configured to:
include in an SWm Authentication and Authorization Request at SWm session initiation, an information element indicating which WLIR mode the ePDG supports.

In an embodiment, said ePDG is configured to:
indicate a default WLIR mode to use for a particular SWm session, in case the ePDG and the 3GPP AAA Server support both WLIR modes.

In an embodiment, said ePDG is configured to:
change the default WLIR mode during a SWm session.

In an embodiment, said ePDG is configured to:
include in a SWm Authorization request an information element indicating a change of default WLIR mode.

In an embodiment, said ePDG is configured to:
choose a default WLIR mode to use for a particular SWm session, based on operator policy, in case the ePDG and the 3GPP AAA Server support both WLIR modes.

Another aspect is a WLAN Access Network WLAN AN, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to) following embodiments, which may be taken alone or in combination, according to various combinations.

In an embodiment, said WLAN AN is configured to:
report a change of WLAN location information to a 3GPP AAA Server, in case of UE mobility, if so requested by the 3GPP AAA Server.

In an embodiment, said WLAN AN is configured to:
trigger a re-authentication and authorization procedure, or a re-authorization procedure over SWa interface to a 3GPP AAA Server, for an existing SWa session,
provide WLAN location information in a SWa Authentication and Authorization Request message sent to said 3GPP AAA Server during said procedure.

In an embodiment, said WLAN AN is configured to:
include in a SWa Authentication and Authorization Request message sent during a re-authorization procedure, a dummy EAP payload or the EAP payload sent in an earlier EAP exchange,
include in said message a flag indicating that in said request the EAP payload can be disregarded.

In an embodiment, said WLAN AN is configured to:
release an existing SWa session and establish a new SWa session,
provide WLAN location information in a SWa Authentication and Authorization Request message sent to said 3GPP AAA Server for establishing said new SWa session.

Another aspect is a 3GPP AAA Server, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to):
In an embodiment, said 3GPP AAA Server is configured to perform at least one of the following actions, upon receipt of a User Profile Update Request from an Home Subscriber Server HSS to request WLAN location information for Untrusted WLAN access:
return the WLAN location information in an Untrusted WLAN Access to the Home Subscriber Server HSS
initiate a re-authentication and authorization procedure over SWa interface towards the WLAN AN, to retrieve WLAN location information.

Another aspect is an Application Server, configured for the support of reporting or retrieval of location information, referred to as WLAN location information, of a WLAN AN where a User Equipment UE is attached for access to a 3GPP Packet Core Network via Untrusted WLAN access.

Various embodiments may be provided, including (though not being limited to):
In an embodiment, said Application Server is configured to:
send an Sh Pull Request message to a Home Subscriber Server HSS, requesting WLAN location information for Untrusted WLAN access from a 3GPP AAA Server.

Another aspect is an Home Subscriber Server HSS, configured for the support of reporting or retrieval of location information, referred to as WLAN location information, of a WLAN AN where a User Equipment UE is attached for access to a 3GPPa 3GPP Packet Core Network via Untrusted WLAN access.

Various embodiments may be provided, including (though not being limited to):

In an embodiment, said HSS is configured to:

initiate a User Profile Update Request to request WLAN location information for Untrusted WLAN access.

Other aspects relate to method(s) for support of reporting or retrieval of location information, referred to as WLAN location information, of a WLAN AN where a User Equipment UE is attached for access to a 3GPP Packet Core Network via Untrusted WLAN access, said method(s) comprising at least one step performed by at least one of the above entities (3GPP AAA Server, ePDG or PDG, WLAN Access Network, HSS, Application Server).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An evolved packet data gateway (ePDG), comprising
at least one processor; and
at least one memory including computer program code;
the at least one memory and the computer program code being configured to, with the at least one processor, cause the ePDG at least to:
support reporting or retrieval of location information, referred to as wireless local area network location information, of a wireless local area network access network where a user equipment is attached for access to a third generation partnership project packet core network via untrusted wireless local area network access during a first packet data network (PDN) connection between the ePDG and said user equipment,
determine, after the first PDN connection has already been established, the ePDG is to report up to date user location information to a packet data network gateway for the first PDN connection,
query, after the first PDN connection has already been established, up to date wireless local area network location information from a third generation partnership project authentication authorization accounting server, based on determining the ePDG is to report said up to date user location information to said packet data network gateway for the first PDN connection.

2. The ePDG according to claim 1, wherein the at least one memory and the computer program code are configured to, with the at least one processor, cause the ePDG at least to:
initiate a new authorization procedure over an SWm interface to said third generation partnership project authentication authorization accounting server,
receive one of said wireless local area network location information or an indication of the absence of said wireless local area network location information in an SWm authorization answer received from the third generation partnership project authentication authorization accounting server during said new authorization procedure.

3. The ePDG of claim 2, wherein the at least one memory and the computer program code are configured to, with the at least one processor, configure the ePDG to perform both of
receive the wireless local area network location information when an indication of the absence of wireless local area network location information is not received, and
receive the indication of the absence of wireless local area network location information when the wireless local area network information is not received.

4. The ePDG according to claim 1, wherein the at least one memory and the computer program code are configured to, with the at least one processor, cause the ePDG at least to:
receive an SWm authorization answer from the third generation partnership project authentication authorization accounting server, said SWm authorization answer including:
a wireless local area network location information element comprising the location information of the wireless local area network access network where the user equipment is attached.

5. The ePDG according to claim 1, wherein said SWm authorization answer further includes:
a wireless local area network location timestamp information element comprising a network time protocol time at which the user equipment was last known to be in the location reported in the wireless local area network location information information element.

6. An apparatus comprising
at least one processor; and
at least one memory including computer program code;
the at least one memory and the computer program code being configured to, with the at least one processor, cause the apparatus at least to:
perform functions of a third generation partnership project authentication authorization accounting server,
support reporting or retrieval of location information, referred to as wireless local area network location information, of a wireless local area network access network where a user equipment is attached for access to a third generation partnership project packet core network via untrusted wireless local area network access during a first packet data network (PDN) connection between an evolved packet data gateway (ePDG) and the user equipment,
receive, after the first PDN connection has already been established, a query from the ePDG for up to date wireless local area network information, based on a determination that the ePDG is to report up to date user location information to a packet data network gateway for the first PDN connection,
provide, based on said query, to the ePDG one of said wireless local area network location information for the first PDN connection or an indication of the absence of said wireless local area network location information for the first PDN connection.

7. The apparatus according to claim 6, wherein the at least one memory and the computer program code are configured to, with the at least one processor, cause the apparatus at least to:
provide said wireless local area network location information or an indication of the absence of said wireless local area network location information in an SWm authorization answer sent towards said ePDG during an authorization procedure over an SWm interface initiated by said ePDG.

8. The apparatus according to claim 6, wherein the at least one memory and the computer program code are configured to, with the at least one processor, cause the apparatus at least to:
send an SWm authorization answer to the ePDG, said SWm authorization answer including:
a wireless local area network location information element comprising the location information of the wireless local area network access network where the user equipment is attached.

9. The apparatus according to claim 8, wherein said SWm authorization answer further includes:
a wireless local area network location timestamp information element comprising a network time protocol time at which the user equipment was last known to be in the location reported in the wireless local area network location information information element.

10. The apparatus of claim 6, wherein the apparatus is configured to perform both of
provide the wireless local area network location information when an indication of the absence of wireless local area network location information is not being provided, and
provide the indication of the absence of wireless local area network location information when the wireless local area network location information is not being provided.

11. A method of an evolved packet data gateway (ePDG), the method comprising:
supporting reporting or retrieval of location information, referred to as wireless local area network location information, of a wireless local area network access network where a user equipment is attached for access to a third generation partnership project packet core network via untrusted wireless local area network access during a first packet data network (PDN) connection between the ePDG and said user equipment,
determining, after the first PDN connection has already been established, the ePDG is to report up to date user location information to a packet data network gateway for the first PDN connection,
querying, after the first PDN connection has already been established, up to date wireless local area network location information from a third generation partnership project authentication authorization accounting server, based on determining the ePDG is to report up to said date user location information towards said packet data network gateway for the first PDN connection.

* * * * *

UNITED STATES PATENT AND TRADEMARK OFFICE
CERTIFICATE OF CORRECTION

Page 1 of 1

PATENT NO. : 11,729,739 B2
APPLICATION NO. : 15/775187
DATED : August 15, 2023
INVENTOR(S) : Bruno Landais et al.

It is certified that error appears in the above-identified patent and that said Letters Patent is hereby corrected as shown below:

On the Title Page

On Page 2, item (56), under FOREIGN PATENT DOCUMENTS, insert -- WO 2013/134669 A1 09/2013 --

Signed and Sealed this
Seventh Day of May, 2024

Katherine Kelly Vidal
*Director of the United States Patent and Trademark Office*